Nov. 10, 1942.　　　　M. FALK　　　　2,301,531
KEY BLANK AND METHOD OF MAKING THE SAME
Filed June 4, 1942
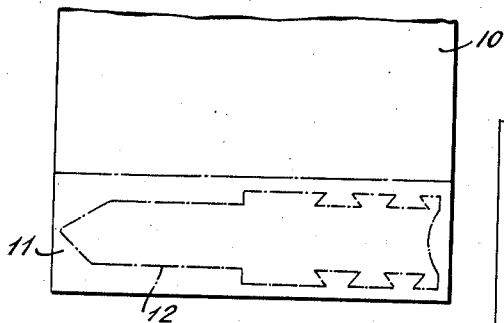
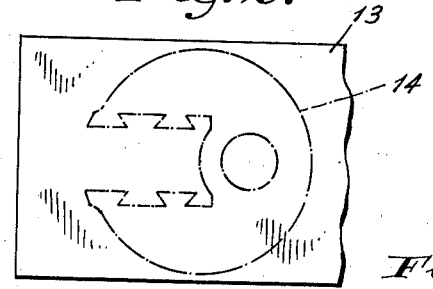
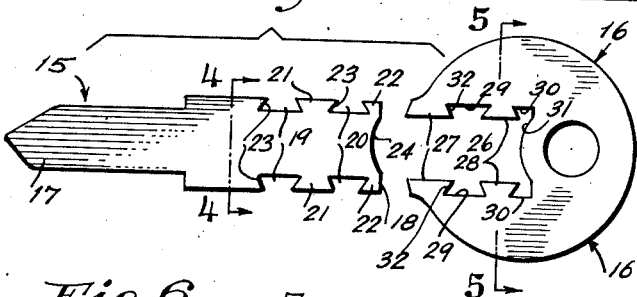
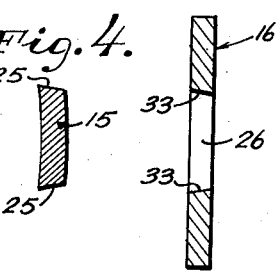
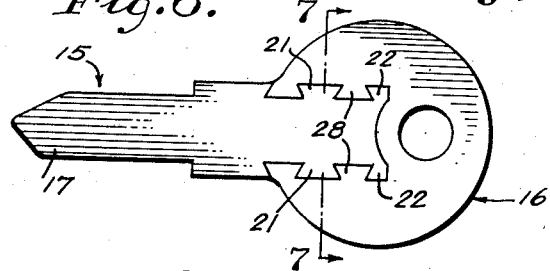
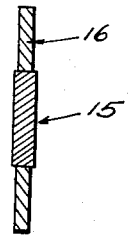
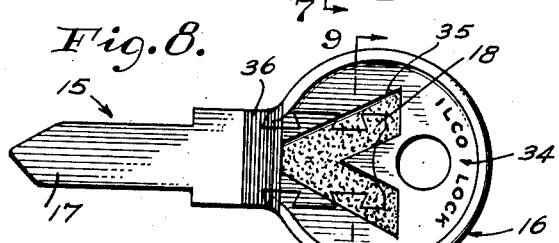
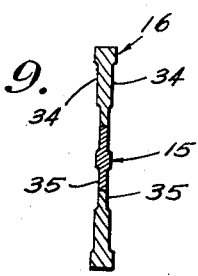
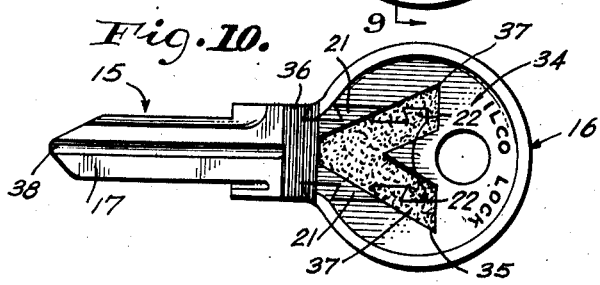
INVENTOR.
Morris Falk
BY
J. G. Basseches
his ATTORNEY Patented Nov. 10, 1942

2,301,531

UNITED STATES PATENT OFFICE 2,301,531

KEY BLANK AND METHOD OF MAKING THE SAME

Morris Falk, Leominster, Mass., assignor to Independent Lock Company, Fitchburg, Mass., a corporation of Massachusetts Application June 4, 1942, Serial No. 445,709

14 Claims. (Cl. 76—110)

This invention relates to key blanks and to a method of producing the same. More particularly, my invention relates to the method for the formation of key blanks for a pin tumbler type of lock and the resultant product.

Key blanks as known to me for the pin tumbler type of lock involve two essential parts comprising the shank portion and the knob portion. The shank portion of these key blanks is submitted to a large variety of machine operations, including longitudinal milling to conform to the key hole opening, in addition to the grinding and filing in forming the key with the slots for operation of the tumbler pins.

The requirements of the shank to withstand the stresses to which the key blank shank is subjected imposes upon this element of the key amenability to a wide variety of machining operations, including malleability, non-crystalline properties, lack of brittleness. Materials containing such properties are brass, nickel-silver, silver, gold and like metals or alloys characteristic of the dominant properties of gold, copper and silver. These materials are available in limited quantities, if at all, and therefore introduce an exceedingly high element of cost in the production of the key blank when, in fact, it is but a portion of the entire body of the key which is subjected to a variety of the machining or manipulating operations.

While, in the interests of economy, endeavors have been made to form the key blanks from metal, such as steel, iron, cast bronze and other alloying compositions, the low malleability of such metals as iron and steel cannot withstand the stresses in finishing the keyblank, nor are they amenable to the tools employed by locksmiths to file or grind the pin tumbler ridges.

I have discovered and it is an object of my invention to provide a method for making key blanks which is predicated upon the feature that by making the shank portion of the key of the more expensive, malleable or soft metals and making the knob of less expensive, substantially non-malleable or hard metals, a highly desirable keyblank is provided, which effects a very material saving of the more expensive metal, without loss of the essential properties of the keyblank to withstand the stresses encountered in milling, filing, cutting, grinding, or any other of the locksmith's operations.

I have further discovered, and it is an object of my invention to provide a method of making a key blank which is based upon the features that by a locking engagement between a shank forming portion and a knob forming portion, the blanking-out operation incident to stamping these parts from sheet metal and the incident taper or "draw" tolerance due to the stamping operation, may be turned to advantage in providing a highly effective preliminary engagement conducive to a transverse interlocking of the elements.

Other objects of my invention reside in the provision of knob interlocking means whereby flat keys may be made of two part construction from flat stock employing dissimilar metals in the various portions of the keyblank structure, each adequately meeting the requirements in manufacturing and using the keyblank, and the resultant key.

For the attainment of the foregoing objects and such further objects as may appear herein or be hereinafter pointed out, I make reference to the accompanying drawing forming a part hereof, in which:

Figure 1 is a fragmentary plan view of the shank stock and shank blank outlined thereon;

Figure 2 is a fragmentary plan view of the knob stock and knob blank outline;

Figure 3 shows the two sections of the shank and knob after the dieing-out operation;

Figure 4 is a section taken on the line 4—4 of Figure 3;

Figure 5 is a section taken on the line 5—5 of Figure 3;

Figure 6 is a plan view of the shank and knob in assembled position;

Figure 7 is a section taken on the line 7—7 of Figure 6;

Figure 8 is a plan view of the key blank after the stamping operation;

Figure 9 is a section taken on the line 9—9 of Figure 8;

Figure 10 is a plan view of the completed key blank.

Making reference to the drawing, 10 represents the stock material made of sheet brass, nickel-silver, silver, gold, or any of the relatively soft or malleable metals or metal alloys characteristic of the ductility imparted by large percentages of copper, silver or gold. A segment 11 from which a shank element is to be formed is represented by the cutting line and it is procured by the initial punching operation. The shank is outlined in dotted lines at 12.

In Figure 2, the stock 13 is a strip of sheet metal of low malleability, by which I mean to include iron, steel and like less precious metals which are relatively hard, having lower malleability and cost. Aluminum alloys may be employed.

Outlined in dotted lines at 14 is the knob forming blank. The dieing-out operation serves to provide the shank forming portion 15 and the knob forming portion 16.

The shank forming portion is formed adjacent one end with the keyhole tongue 17, and at its opposite end 18 with the knob engaging sections comprising recesses 19 and 20, defined by the lugs 21 and 22. The recesses 19 and 20 are each provided with undercut side walls 23.

At the end of the shank, an arcuately formed recess 24 is provided.

Viewed transversely, the shank 15 has the edges thereof 25 slightly tapered (shown in magnified form for emphasis) as an incident of the stamping operation, representing the tolerance for "draw" as a result of the punching operation.

The knob forming element 16 is cut out at 26 to provide lugs 27 and 28, outlining recesses 29 and 30, and an arcuately shaped wall 31. The lugs 27 and 28 are generally formed to interfit the recesses 19 and 20, respectively, the recess 30 being formed to receive the lug 22.

The side walls 32 of each of the recesses 29 and 30 are undercut to dovetail with the overhang of the lugs 21 and 22.

While I have shown the recesses 19, 29 and 30 and the lugs 21, 22, 27 and 28 of a general dovetail outline, it will be understood that simplification in manufacture may dictate that other configurations be employed, whether following straight or arcuate lines.

The inner edges 33 of the cutout 26 are slightly tapered (shown magnified for emphasis) as an incident of the punching operation, in accordance with the detail described in connection with the shank 15. With the shank element 15 and the knob element 16 formed as described, assembly is effected by transversely nesting the end 18 into the cutout 26, so as to complementarily align the edges 25 and 33 in a direction to wedge the shank into the knob.

For the shank 15 I prefer to employ sheet material of slightly thicker material than the stock from which the knob forming portion 16 is formed. This results in an assembly more clearly illustrated in Figure 7.

After nesting the end 18 into the slot 26 of the knob 16, the assembly is subjected to a stamping operation which embosses the faces 34 of the knob with such ornamentation and marking as is usually employed on the face of the key knob and, in addition, I find it desirable to include as part of the stamping operation, an impresssion 35 which overlaps the more malleable and the less malleable segments of the key knob.

The impression in the embodiment illustrated in Figures 6 and 8 comprises transverse sections 36 and angular sections 37. This impression tends to cause the soft or more malleable metal of the shank to flow in respect of the hard or less malleable metal of the knob. Thus, the flowing of the metal of the shank accentuates the driving fit secured in first assembling the shank and knob, as illustrated in Figure 6. This condition will become more clearly apparent from an inspection of Figure 9, which shows that there are two different thicknesses of metal at this point as caused by the localization of blow or force of the impression. This and the overlapping character of the stamping operation is availed of to drive the soft or more malleable metal into the undercut recesses 29 and 30, and about the lugs 27 and 28. By forming the wall 31 arcuately, as described, I am assured of a flow of the soft or more malleable metal sidewise into the recesses 29 and 30 with greater certainty.

After the operations as described, the key blank is completed and ready for distribution to the locksmith, upon formation of the longitudinal slots 38 to give the key the desired transverse configuration corresponding to the keyhole slot, whereupon it is ready for the plating step, which is desired to cover the knob forming portion.

By stamping out the knob of hard or less malleable metal than the shank part, the stamping operation is availed of to cause the soft or more malleable metal to flow into the interstices or recesses of the hard or less malleable knob forming section and around the lugs, to effectively key the parts together to resist all stresses normally encountered in a device of this character. The employment of steel or iron for the knob forming portion permits a non-obliterating stamping to be formed on the knob, as well as to withstand the stresses in stamping and flowing of the soft or more ductile or malleable metal of the shank into secure engaging relationship, notwithstanding the use of flat stock for cutting of these parts.

It will thus be observed that by my method I have provided a key blank which has all of the desirable attributes of a flat stock key in that the shank is formed to withstand the stresses incident to the milling, filing, cutting, grinding and other locksmith's operations.

Having thus described my invention and illustrated its use, what I claim is new and desire to secure by Letters Patent is:

1. The method of forming key blanks from flat stock metal comprising forming a shank portion of malleable metal and a knob forming portion of less malleable metal, the knob forming portion being cut out to envelop the shank forming portion, nesting the engaging portions and causing the malleable metal of the shank to flow into engagement with the cutout of the knob.

2. The method of forming key blanks from flat stock metal comprising forming a shank portion of malleable metal and a knob forming portion of less malleable metal, the knob forming portion being cut out to envelop the shank forming portion and provided with undercut recesses and enlarged lugs, nesting the engaging portions and causing the malleable metal of the shank to flow into engagement with the cutout of the knob and into the undercut recesses and about the lugs.

3. The method of forming key blanks from flat stock sheeted metal comprising forming a shank portion of malleable metal and a knob forming portion of less malleable metal, each of which being formed with complementarily outlined engaging portions, the side edges of which are tapered and the knob forming portion of which being cut out to envelop the shank forming portion, nesting the engaging portions to have the taper edges of the shank provide entrant edges and then causing the malleable metal of the shank to flow into engagement with the cutout of the knob.

4. The method of forming key blanks from flat stock sheeted metal comprising forming a shank portion of malleable metal and a knob forming portion of less malleable metal, each of which being formed with complementarily outlined engaging portions, the side edges of which are tapered and the knob forming portion of which being cut out to envelop the shank forming portion, nesting the engaging portions to have the taper edges of the shank provide entrant edges and then causing the malleable metal of the shank to flow into engagement with the cutout of the knob, the complementarily formed engaging portions defining dovetailing undercut recesses and enlarged lugs whereby the metal of the more malleable shank forming portion flows into the complementary enveloping portion of the knob.

5. In the method of forming key blanks from flat stock metal sheeting comprising forming a key shank of relatively malleable metal and provided at end with lugs, forming a knob of less malleable metal with a cut out portion having complementary recesses in relation to the shank, laterally nesting the shank and knob portions to interlock the same and then stamping the interlocked portions by a stamping operation overlapping the shank and knob to flow the malleable metal into the recesses of the knob whereby a substantially continuous surface is formed.

6. The method of forming key blanks from flat stock sheet metal comprising stamping a shank forming portion of relatively malleable metal taken from the group consisting of sheet brass, nickel-silver, silver, gold, forming a knob of less malleable metal, taken from the group consisting of iron, and steel, forming complementary engaging portions arranged to dovetail on said shank and knob, laterally nesting the engaging portions of said shank and knob into dovetailing position, and causing the malleable metal to flow into engagement with the knob.

7. The procedure in accordance with claim 6, wherein the edges of the interlocking portion are tapered to provide lateral entrant edges for the nesting operation aforesaid.

8. A key blank comprising a shank of malleable sheeted metal and a knob of less malleable sheeted metal having interlocking sections nested throughout the depth of said sheets.

9. A key blank comprising a shank of malleable metal taken from the group comprising brass, nickel-silver, silver, gold alloys and a knob forming portion comprising sheeted iron and steel, the shank and knob having nested interlocking portions throughout the plane of the sheets.

10. A key blank comprising a shank of relatively malleable metal, a knob of less malleable metal, complementary lugs and sections formed on said shank and knob, laterally dovetailed throughout the thickness of the metal of said shank and knob.

11. A key blank comprising a shank of relatively malleable metal, a knob of less malleable metal, complementary lugs and sections formed on said shank and knob, laterally dovetailed throughout the thickness of the metal of said shank and knob, and a stamping impressed upon said shank and knob in overlapping relationship causing the metal of said shank to flow into the recesses of said knob.

12. A key blank comprising a shank of sheeted relatively malleable metal, a knob of sheeted less malleable metal, interlocking means comprising complementarily outlined lugs and recesses laterally dovetailed throughout the thickness of said metal, the lugs of said shank being expanded and flowed under pressure into the recesses of said knob.

13. A key blank comprising a shank of sheeted brass and a knob of sheeted steel, having interlocking sections nested throughout the depth of said sheets.

14. A key blank comprising a shank of relatively soft sheeted metal taken from the group consisting of brass, nickel, nickel-silver, silver, gold and like alloys, and a knob of relatively harder sheeted metal taken from the group consisting of steel, having interlocking sections nested throughout the depth of said sheets.

MORRIS FALK.